Figure 1:
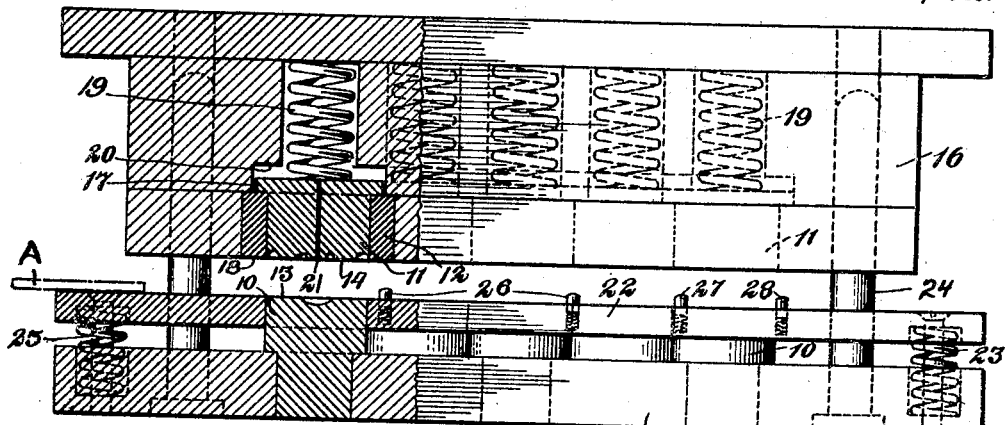

S. SKOLNICK.
PROCESS AND APPARATUS FOR MAKING BUTTONS.
APPLICATION FILED APR. 22, 1919.

1,318,700.

Patented Oct. 14, 1919.

INVENTOR
Samuel Skolnick
BY
C. W. Fairbank
ATTORNEY

UNITED STATES PATENT OFFICE.

SAMUEL SKOLNICK, OF BROOKLYN, NEW YORK, ASSIGNOR TO GOLDBERG, DAVIDSON CO., OF NEW YORK, N. Y., A CORPORATION OF NEW YORK.

PROCESS AND APPARATUS FOR MAKING BUTTONS.

1,318,700.   Specification of Letters Patent.   Patented Oct. 14, 1919.

Application filed April 22, 1919. Serial No. 291,868.

*To all whom it may concern:*

Be it known that I, SAMUEL SKOLNICK, a citizen of the United States, and a resident of Brooklyn, in the county of Kings and State of New York, have invented certain new and useful Improvements in Processes and Apparatus for Making Buttons, of which the following is a specification.

This invention relates to the manufacture of buttons from sheet material, although from the very nature of the invention it will be apparent that it may be employed in the manufacture of other articles of approximately disk shape, such for instance, as poker chips, checkers, dominos, medals, medallions, and the like of circular or any other form. In carrying out my invention, I utilize sheet material of a thickness approximating the thickness of the completed article and of such a character that it may be molded or pressed to produce the desired face configuration, oranmentation and embossment. As a preferred example of such material, I employ sheet celluloid or celluloid-like composition, although other material having somewhat the same general properties and capable of being cut and pressed may be employed.

As one feature of my invention I employ coacting die members between which the sheet of material is placed and by which a disk is cut from the sheet and pressed to force the material to flow, bend, or move to follow the exact configuration of the faces of the die members. In making a button, these faces would be quite different in contour, so as to make the desired peripheral edge, the ornamental face, and the plainer back of the button. A pair of die members not only move toward and from each other to permit the insertion, forming, and removal of the article, but at the same time, have a relative movement in respect to a third encircling combined cutter and die member into which one of the first mentioned die members enters to cut the material to the desired circular or other shape from the sheet and at the same time prevent or limit the radial flow of the material during the application of the high pressure necessary to emboss, ornament and form the article.

This outer encircling member forms a peripheral wall of an internal form or curvature corresponding to the external form or curvature of the two main die members which move therein. The three members together form a chamber or space occupied by the article during the application of pressure by the main die members. Thus the completed article by its engagement with the outer wall will have the desired smooth regular periphery and any roughening of the edge during the cutting out operation will be eliminated.

As a further important feature I so arrange a plurality of these die sets so as to simultaneously form a plurality of buttons or other articles from a single sheet at distances so spaced from each other that after one button or other article forming operation is completed, the balance of the sheet may be advanced a distance equal to a little more than the diameter of one article and the operation repeated a single time to utilize the remaining available space of the sheet for the simultaneous formation of a second and equal number of the article.

In carrying out my invention, I utilize an apparatus, one embodiment of which is illustrated in the accompanying drawings to which reference is to be had.

Figure 2:
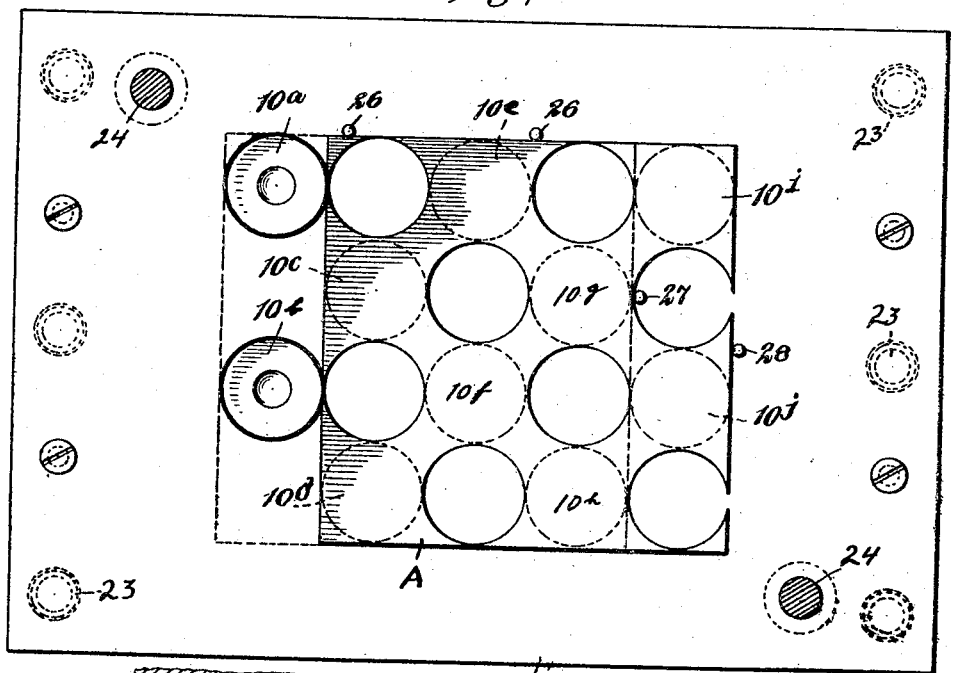
Figure 3:
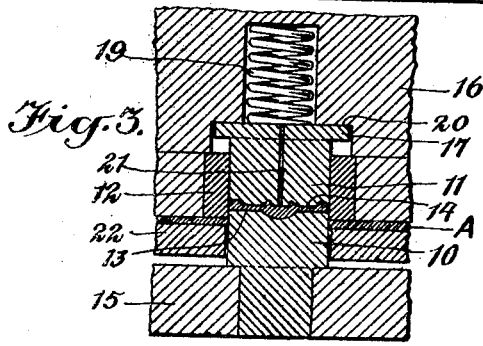

In these drawings:

Figure 1 is a side elevation of a device constructed in accordance with my invention, a portion being broken away along the center of one set of die members, Fig. 2 is a horizontal section on a plane between the sets of die members, and indicating the two successive positionings of the stock, and Fig. 3 is a section similar to a portion of Fig. 1 but showing the parts in the position they occupy at the end of the pressure applying operation.

In forming a single button I employ three co-acting die members which may for example take the forms illustrated in the drawings as the members 10, 11, and 12. Two of these members 10 and 11 present faces 13 and 14 of the diameter of the desired button or other article and shaped to produce the desired face and back configuration of the botton. If it is desired to make the button slightly convex on the back side so that the edges will better stand away from the garment or other fabric, the face of one of the dies, as for instance, the face 13, is made slightly concave, and if the face of the button is to have concentric ridges with or without other ornamentation, the other face 14 has an intaglio with grooves, etc. I, of course, do not desire to be limited to any particular configuration for the faces 13 and 14.

The two die members 10 and 11 are of the same diameter and co-axial and are relatively movable in respect to each other along the common axis. One of these die members, as for instance, the member 11 is mounted within the third or annular die member 12 and is movable relatively to the annular die member. As shown the annular die member 12 encircles the die member 11 and the die member 10 is movable into and out of the open end of the annular die member 12. The three die members may be mounted in various different ways so as to get the desired relative movements. As shown, the die member 10 is rigidly secured to a carrier 15 while the annular die member 12 is rigidly secured to a carrier 16. In practice one of these carriers, as for instance, 16 is rigidly supported while the other carrier, as for instance 15 is movable toward and from the other in a heavy press or by other means. The die member 11 has an annular flange 17 normally engaging with the upper and inner end of the die member 12 and limiting the relative movement of the two in one direction with the face 14 approximately flush with the lower end or face 18 of the die 12. A heavy coil spring 19 in the carrier 16 presses the die 11 downwardly to its limiting position in respect to the carrier 16 but may be compressed to permit an upward movement of the die 11 within the carrier until the flange 17 abuts against the shoulder 20.

In operation the parts are normally positioned substantially as shown in Fig. 1. A sheet A of the desired material, as for instance, celluloid, of a thickness approximately equal to the thickness of the desired button, is placed over the die 10 and beneath the dies 11 and 12. The carriers are then brought toward each other, as for instance, by the upward movement of the carrier 15. A disk or blank of the same peripheral form and shape as the dies will be cut from the sheet as the die 10 enters the die 12. At the same time, the body of such disk is compressed between the faces 13 and 14. Upon the further upward movement of the carrier 15, the flange 17 will engage with the shoulder 20 and thereafter the full force of the upward movement of the carrier 15 will be applied directly to both of the dies 10 and 11 and the very high pressure will be exerted upon the disk between the faces 13 and 14 and within the annular wall formed by the inner surface of the die 12. In this closed chamber, the material is caused to flow or to be deformed to exactly conform to the upper and lower die faces 13 and 14 and its periphery will be rendered perfectly smooth by the peripheral confining wall formed by the die 12. Any air which may be trapped in the chamber may be permitted to escape through a fine hole 21 extending co-axially through one of the die members, as for instance, the die member 11 but this hole is preferably of such small size in respect to the plasticity of the material from which the button is to be formed that little or none of such material will enter the hole.

As soon as the desired pressure has been exerted and the button formed, the lower carrier is lowered and the parts returned to the position shown in Fig. 1. The spring 19 brings the die 11 down to its limiting position and thereby the button is ejected from the chamber as a complete article save for the drilling of holes therethrough, whereby the button may be sewed on. To withdraw the die 10 from the remainder of the sheet and permit the quick and ready advancement or removal of the balance of the sheet, there is provided a stripper plate 22 normally held with its upper surface approximately flush with the upper surface 13 of the die member 10. Suitable springs 23 are shown as being used between the carrier 15 and the stripper member 22 so that the latter may be freely depressed as the die 12 engages therewith but will rise again to bring the sheet to a position above the face of the die 10 when the operation is completed. Any suitable means may be employed for preventing any relative lateral movement of the carriers 15 and 16 and to insure the proper alinement of the dies. As illustrated, I employ dowel pins 24 rigid with the carrier 15 and slidable within guiding apertures 25 in the carrier 16.

It will of course be evident that in referring to the die 11 as the upper die and the die 10 as the lower one, I do not wish to be understood as implying that this relative arrangement is necessary or even preferable. The entire device may be reversed and operated equally satisfactorily, or other relative positions may be employed.

In forming buttons from sheet celluloid, I find that the most satisfactory results are secured by the use of a limited amount of heat which may very slightly soften the sheet or in any event, facilitate the flow of the material under the pressure of the dies. In practice, the sheet itself may be warmed or heated before being inserted between the dies, or suitable heating means, such as steam chambers, electric resistance coils, gas burners, or other means for keeping the dies themselves at the desired temperature may be employed. I have referred to the inner surface of the annular die 12 as forming the peripheral wall of the chamber in which the button is formed. It will of course be evident that if it is desired to have the button present a comparatively sharp peripheral edge, the die faces 13 and 14 may be so formed as to come together at their edges and in that event, the member 12 will serve only to coöperate with the die 10 in cutting the disk from the blank.

As a further important feature of my invention, I employ a plurality of the above described sets of dies so arranged in respect to each other that a plurality of buttons or other articles may be formed at the same time and all of the available space of a sheet may be converted into the desired articles by two successive die operations with a single intermediate advancement of the material. The sheets of stock may be cut into square or other rectangular form and the sets of dies are spaced apart lengthwise and transversely to distances a trifle more than the width of a die. Merely as an example, I have shown the device for operating upon a sheet capable of producing sixteen buttons in four rows of four each. For this purpose I provide ten sets of dies designated in Fig. 2 as $10^a$ to $10^j$ inclusive. These are arranged in five transverse rows of two sets of dies to each row, the sets of dies of each row being diagonally disposed in respect to those of the previous row. The sheet is first placed in position over the sets of dies $10^a$ to $10^h$ and eight buttons are formed. The sheet is then advanced a distance a trifle more than the diameter of the dies 10 and 11 and so as to come beneath the sets of dies $10^c$ to $10^j$ inclusive. It will be noted that these sets of dies now come opposite the spaces of the blank from which no buttons were formed in the previous operation. On again depressing the upper die members, another set of eight buttons will be formed. In this way all of the available space of the sheet is utilized and a single advancement of the stock between two successive die operations is a mere sliding in one direction without reversal in position or other movement. Any suitable means may be employed for insuring the accurate positioning of the stock between the dies. For instance, I employ pins 26 with which one edge of the sheet will engage and pin 27 with which the second edge will engage for the first operation. In addition to these, a third pin 28 will insure the accurate second positioning of the sheet. All of these pins may be carried and mounted in the stripper 22, and spring pressed so that as the dies come together, the guide pins will be depressed into their respective sockets. The pin 28 may be omitted and the pin 27 engage in the side of a hole rather than the edge of the sheet for the second operation.

By means of my invention I am able to produce buttons complete, except for the holes therethrough, and other articles in large quantities by a single operation. It will not be necessary to polish, trim, or otherwise operate on the articles after they come from the machine with the exception of producing the holes as above noted. No special skill will be required on the part of the operator so that comparatively cheap labor may be employed and the rate of production and simplicity of operation insures a perfect, uniform, attractive, and serviceable button or other article at very much lower cost than they can be produced by any other process or any other apparatus known to me. In order to manufacture buttons of different designs and styles, it is only necessary to substitute for the central die members, new ones having the desired face configuration. Thus the production of buttons of various different designs and styles and other articles may be produced by the same machine at comparatively slight expense with the change of only one or two of the three die members employed for each button or other article. Although I have illustrated die members of such form that they make circular buttons, it will of course be evident that this particular shape is not at all important and that articles of elliptical or any other desired regular or irregular shape may be manufactured. The dies are described as cutting disks from the sheet but by the term disk I do not wish to be limited to any particular shape or size. I have shown the upper carrier as made up of separate superposed sections and have shown the annular die member 12 as formed of a separate piece of metal from the carrier. It will of course be evident that the die member 12 may be integral with the lower sections of the carrier or if of a separate piece, then the carrier may be made integral instead of in sections. The sheet material operated upon may be single ply stock or may be made up of multiple ply with the faces of the sheet of different material than the body.

Having thus described my invention, what I claim as new and desire to secure by Letters Patent is:

1. An apparatus for forming buttons or the like, including a pair of relatively movable one-piece dies presenting opposed dissimilar die faces of the same size for embossing a disk, one of said dies presenting a cutting edge encircling its face, an annular die member presenting a cutting edge coöperating with said first mentioned cutting edge to cut the disk from a sheet as the members presenting said cutting edges telescope, and means for preventing said cutting action until after the beginning of the embossing action, said annular die member presenting a peripheral wall, limiting lateral flow of the material of the disk after the latter has been cut from the sheet and during the final pressing and embossing action between said first mentioned die members.

2. A one-piece die presenting an operating face encircled by a cutting edge, an annular die co-axial therewith and presenting a cutting edge, said first die being movable into said annular die to cut a disk from a sheet of material, and a third one-piece die within said annular die, movable relatively thereto and presenting an operating face of the same size as the operating face of the first mentioned die and coöperating with the latter to emboss one of both faces of the disk.

3. The method of forming buttons or other articles, which includes applying limited pressure to the opposite sides of a sheet of semi-plastic material by two different intaglio die faces of the same size to partially emboss the same, thereafter shearing off the portions of said sheet projecting from between said die members and then completing the embossing action by the application of further pressure of said die faces while preventing radial flow of the material at said sheared edge by the shearing member during the final embossing action, thereby causing said edge to conform to the inner surface presented by said shearing member.

4. An apparatus for forming embossed disks, including a pair of co-axial, relatively movable die members having non-parallel faces, adapted to engage with opposite sides of a sheet of material and emboss the opposite sides to the desired shape for the opposite surfaces of the disk, and an annular member normally encircling one of said die members and presenting an annular cutting edge coöperating the periphery of the die face of the other die member upon its axial movement to cut the disk from a sheet of material.

5. An apparatus for forming buttons, including a pair of relatively movable carriers, a circular die rigidly mounted on one, an annular die member rigidly mounted on the other and having an internal diameter equal to the external diameter of said first die and receiving the latter to cut a circular disk from a sheet of semi-plastic material, a second circular die within said annular die and having its face normally substantially flush with the outer end of said annular die and having a flange engaging with the inner end of said annular die, to limit the outward movement of said second circular die past said flush position, a spring resisting the relative inward movement of said second circular die within said annular die, and a shoulder on the upper carrier for limiting said relative upward movement and permitting the application of embossing pressure on the disk while within said annular die.

6. An apparatus for forming buttons or other articles from rectangular sheets, including a plurality of rows of sets of dies, the sets of dies in each row being spaced apart approximately equal to the diameter of the article and the sets of dies of successive rows being arranged alternately with those of the preceding row and the number of rows being one greater than the number of rows which can be formed from said sheet, whereby one half of the available space of the sheet may be operated upon by one operation of said dies and the remaining available portion of the sheet may be operated upon after an advancement of the sheet in one direction to a distance approximately equal to the diameter of the article.

Signed at New York, in the county of New York and State of New York this 18th day of April, A. D. 1919.

SAMUEL SKOLNICK.